(12) United States Patent
Price et al.

(10) Patent No.: US 6,486,570 B1
(45) Date of Patent: Nov. 26, 2002

(54) WAVEFORM CORRECTION FILTERS

(75) Inventors: Edward G. Price, Carson City, NV (US); Theodore Thibault, Carson City, NV (US); Andrew Pickett, Carson City, NV (US)

(73) Assignee: Environmental Potentials, Inc., Carson City, NV (US)

( * ) Notice: Subject to any disclaimer, the term of this patent is extended or adjusted under 35 U.S.C. 154(b) by 245 days.

(21) Appl. No.: 09/618,498

(22) Filed: Jul. 18, 2000

(51) Int. Cl.[7] .................................................. H02J 1/02
(52) U.S. Cl. .................... 307/105; 307/106; 361/89; 361/104
(58) Field of Search ................................ 307/105, 106; 361/89, 104

(56) References Cited

U.S. PATENT DOCUMENTS 4,616,286 A * 10/1986 Breece ......................... 361/56

* cited by examiner

Primary Examiner—Stephen W. Jackson
Assistant Examiner—Robert L DeBeradinis
(74) Attorney, Agent, or Firm—John E. Wagner

(57) ABSTRACT

A waveform correction filter is connected into an alternating current power line to absorb and remove various forms of power pollution, including high-frequency spikes, surges and other forms of high-frequency oscillations, such as those which result from switching inductive loads on and off. The waveform correction filter of the invention includes a fuse and a coaxial amorphous toroidal inductor connected between a power line and neutral with a low-pass filter connected in series with the fuse and coaxial amorphous toroidal inductor. The filter includes a capacitor, a varistor connected in parallel with said capacitor, and a magnetic core inductor connected in series with each other and in parallel with the capacitor and said varistor. A lamp may be connected in series with the resistor and the magnetic core inductor or across the resistor. Various arrangements are shown for connecting a plurality of the waveform correction filters into single phase or three-phase Wine or delta circuits.

20 Claims, 4 Drawing Sheets $$V_{Z_V} = \left[\frac{Z_V}{Z_V + Z_S}\right] V_{ac}$$

WAVEFORM CORRECTION FILTERS

BACKGROUND OF THE INVENTION

For many years, those who are responsible for monitoring usage of significant amounts of alternating current power have been concerned with the quality of such power. Much of the newer equipment now in use is sensitive to transient voltages, such as spikes, power surges, and random radio frequency (r.f.) noise; but at the same time, such equipment may be creating its own transient voltages which it injects back into the power line. When switches turn off and on, reverberating impulses are created on the line. Motors that start and stop cause power impulses known as surges.

Besides random r.f. pollution, electrical machinery of various kinds may generate harmonic frequencies. All of these kinds of power pollution detract from the efficiency of, inter alia, electric motors, generators, and transformers. The waveform of the power supplied to such equipment becomes distorted resulting in the creation of eddy currents in the ferrous metal parts of such equipment, such as transformer cores and motor stators and rotors. The result is that eddy currents in a motor, for example, dissipate power as heat causing it to consume more power to perform the same tasks. The motor may become damaged, either from the effect of excessive heat or from damage to insulation, causing it to break down long before its expected life.

While much has been done to improve that quality of the power being supplied to various consumers, there has been little recognition of the power pollution produced within a single facility as a result of the operation of significant numbers of electric motors, switches, computers, and other power-consuming devices.

Fundamentally, any time an inductive load is switched off, a very high voltage reverberation rising many times higher than the normal peak value of the applied voltage flows back into the power line. A typical transient voltage is shown superimposed on a sine wave in FIG. 1. The average industrial or commercial circuit receives many daily transients in excess of 1000 volts. These transients reverberate and trigger other oscillations within the network. These reverberations bounce back and forth until they are absorbed or have done damage within the system.

Other disturbances occur when loads are unbalanced in three-phase lines, causing undesirable phase differences between voltage and current. High harmonic neutral currents flow, reacting with transient and surge activity on the line.

From the foregoing, it will be appreciated that the internal power pollution within a network frequently may be a much more serious factor in efficiency of motors, etc., than irregularities in the power supplied from outside the facility.

It has been estimated that up to 60 percent of all electricity is now, or soon will be, passing through non-liner loads. It is such loads that are principal contributors to electric power pollution.

Considerable efficiency gain can be realized if means can be provided, which is connected to the individual power lines to such power-consuming units, which can absorb or otherwise remove such transient voltages, thereby preventing them from being injected back into the power line.

It is, therefore, an object of the present invention to provide a waveform correction filter that removes and absorbs random r.f. noise, spikes, surges, and harmonics from the alternating current power supplied to the above-described power consuming units.

It is another object of the present invention to provide a waveform correction filter in which all components are bi-directional, making the waveform correction filter bi-directional.

It is another object of the present invention to provide a waveform correction filter, which will substantially reduce maintenance costs for the associated equipment.

Other objects and advantages will appear from consideration of the following specification taken in connection with the drawings taken in connection with the drawings:

BRIEF DESCRIPTION OF THE DRAWINGS

This invention may be more clearly understood with the following detailed description and by reference to the drawings in which.

DESCRIPTION OF THE PREFERRED EMBODIMENT

Figure 2:
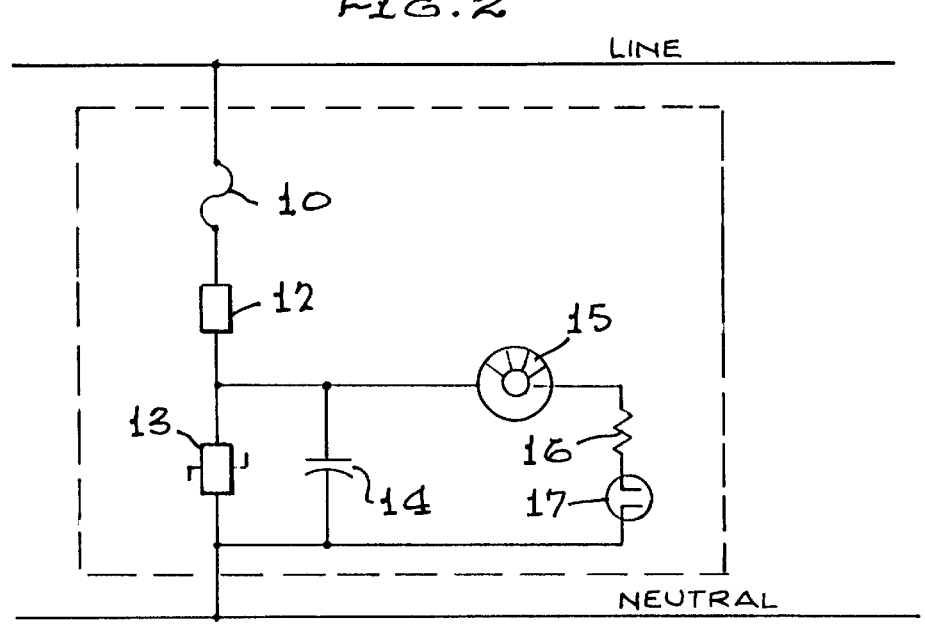
FIG. 2 is a schematic diagram of a basic waveform correction filter system.

The waveform correction filter system of the invention performs in the following way. It is connected across the line (Line to Neutral, typically) as shown in FIG. 2, and acts only upon the disturbances that may exist. The unit performs three important functions:

1. It senses the rising transient voltage and clips and absorbs all energy in excess of 10% above the peak value of voltage. That is, for example, +/−190 volts, in the case of a 120 volt rms. line.
2. It shows down the rise time of the transient, so the rising transient "glides" into the level of clipping. This is done so the clipping will not represent another switching event, thereby causing further ringing.
3. It filters out and absorbs all high-ringing disturbances at a rate of 6 db per decade above 60 hertz.

These actions are depicted in the following illustration:

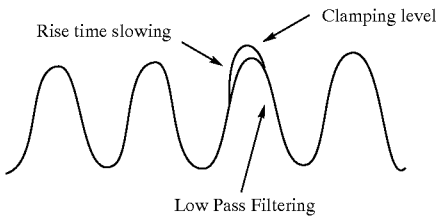

FIG. 2 depicts a typical line to neutral connection of the waveform correction filter of the invention.

Figure 1:
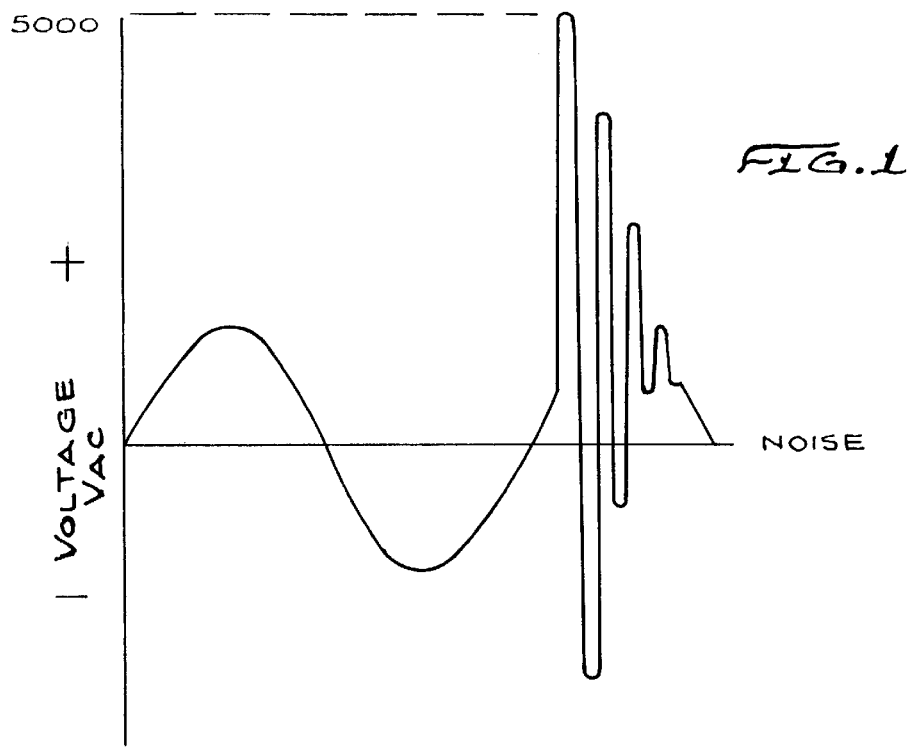
FIG. 1 is a graph showing the distortion of a sinusoidal waveform resulting from a high-frequency transient voltage being imposed on it.

The component items in this schematic are described functionally as follows:

10 FUSE, protective line type
12 INDUCTOR, coaxial amorphous toroid of soft magnetic material
13 VARISTOR, metal oxide
14 CAPACITOR, polypropylene ac rated
15 MAGNETIC CORE, nanocrystalline toroidal
16 RESISTOR, carbon type limiting
17 LAMP, neon The operation of the circuit proceeds as follows:

As the transient shown in FIG. 1 begins to rise, normally in an interval of 1 microsecond, its rise time is initially slowed or extended by a selectable predetermined amount by the INDUCTOR 12, and clamped by the VARISTOR 13 at approximately $\sqrt{2}$ times the rms. line voltage. In the case of a 120 vrms line, this would be about 190 volts. This level depends upon the surge current and line impedance at the instant of the transient rise. Before the transient occurred, the VARISTOR 13 appeared as an infinitely high resistance in the circuit. But, at the instant of clipping, it becomes a very low impedance, and at the same time a current generator. Because the voltage across the CAPACITOR 14 cannot change instantaneously at the instant of the VARISTOR 13 switching, the CAPACITOR 14 becomes virtually a short circuit and provides a path for the high current to flow. Thus, the CAPACITOR 14 begins to charge. Now, connected across the CAPACITOR 14 are the elements depicted in FIG. 2 schematic: MAGNETIC CORE 15, the RESISTOR 16, and the LAMP 17. The VARISTOR 13 switches back to a high impedance, and the CAPACITOR 14 transfers its energy into the components 15, 16, and 17. This energy is calculated to be: E (joules)=V (clamping voltage)×I (surge current)×time. Using a Siemens S20K130 varistor, for example, its maximum energy capacity is 44 joules and clamps between 185 and 225 volts.

The MAGNETIC CORE 15 is a soft magnetic element having relatively very high initial permeability ($\mu$=30,000), extremely low losses, and high saturation flux density (Bsat= 1.2 tesla). This means that the core is very easily magnetized and maintains this condition throughout a wide flux penetration. Thus, the energy that was impressed into the capacitor is now transferred to the "reservoir" of the highly magnetic core. This energy is then processed into the RESISTOR 16 and the equivalent resistance of the LAMP 17, where over a longer span of time such energy is collected and absorbed.

The network, in addition to absorbing the energy of the disturbance, also effectively functions as a low-pass filter.

Now it is important to consider the details of the low-pass filter network.

The voltage clamping device, which we have referred to as the VARISTOR 13 will be simply denoted "MOV" 13. This MOV 13 is a component having a variable impedance depending upon the current flowing through the device or the voltage across its terminals. A nonlinear impedance characteristic is exhibited and Ohm's law applies, but the equation has a variable R. The variation of the impedance is monotonic and does not contain discontinuities.

As has been stated before, the circuit is essentially unaffected by the presence of the MOV 13 before and after the appearance of the over-voltage transient for any steady-state voltage below the clamping level. The voltage clamping action results from the increased current drawn through the device as the voltage tends to rise. If this current increase is greater than the voltage rise, the impedance is nonlinear.

Figure 3:
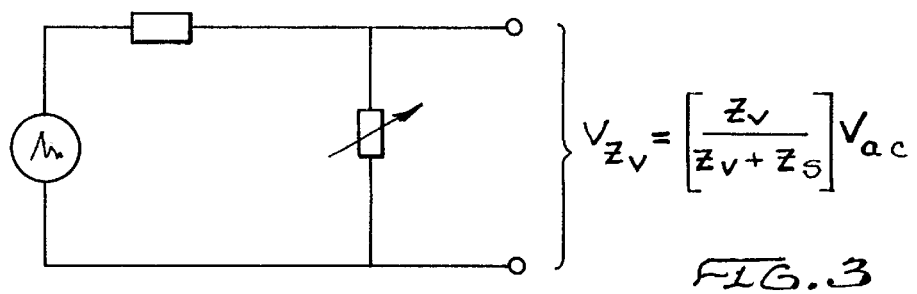
FIG. 3 is a schematic diagram of a voltage divider showing characteristics of the transient voltage suppression system.

The apparent "clamping" of the voltage results from the increased voltage drop (IR) in the source impedance due to the increased current. The device depends on the source impedance to provide the clamping. This action is depicted as a voltage divider, as shown in FIG. 3.

The ratio of the divider is not constant, but changes. If the source impedance is very low, then the ratio is low. The MOV 13 cannot be effective with near zero source impedance and functions best when the voltage divider action can be implemented.

If the MOV were the only component serving in the role of removing over-voltage transients, it can be readily seen that because of its nonlinear switching process, further ringing transients would be generated.

The resulting ringing frequency components of the transient are several orders of magnitude above the power line frequency of an AC circuit and, of course, a DC circuit.

Therefore, an obvious solution is to incorporate a low-pass filter between the source of the transients and the sensitive load.

The simplest form of filter is a capacitor placed across the line. The reactive impedance of the capacitor forms a voltage divider with the source impedance, resulting in attenuation of the transient at high frequencies.

This simple approach can have undesirable side effects, such as:

1. Unwanted resonances with inductive components located elsewhere in the circuit, leading to high peak voltages.
2. High inrush currents during switching, or
3. Excessive reactive load in the power system voltage.

These undesirable effects can be reduced by adding a series resistor. However, the disadvantage of the added resistance is that less effective clamping results.

To achieve maximum success in clamping, attenuating, and absorbing the over-voltage transient energy, a highly permeable magnetic core is incorporated with the above-noted capacitor and damping resistor.

Figure 4:
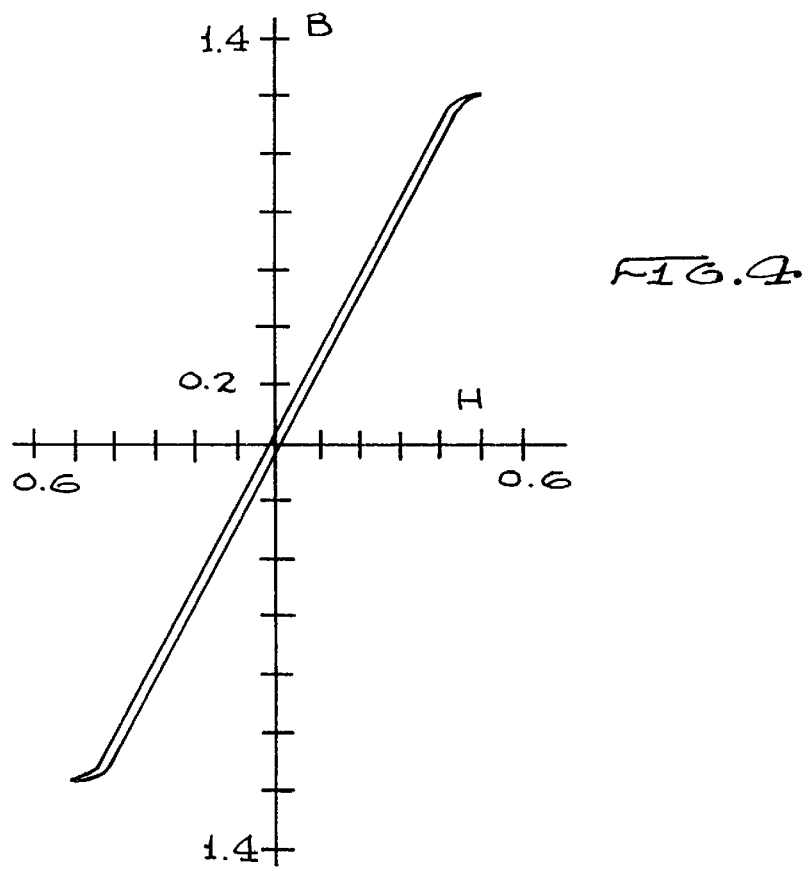
FIG. 4 is a graph showing a typical B-H curve having the characteristics of a magnetic core in applicant's system.

By second-order tuning, a critically damped RLC low pass filter can be created. Thus, the undesirable effects noted just above can be eliminated. However, not just any inductance will function satisfactorily. The specific requirements for this MAGNETIC CORE 15, hereafter referred to as "L", are as follows:

1) Because the capacitor response is nonlinear with frequency, but linear with current, the response of L with respect to current and frequency must be linear. This response requirement is depicted in the hysteresis graph FIG. 4 of Flux density B versus Magnetizing force H.

2) Also, since the impinging oscillatory wave statistically will not be balanced as a pure sinusoidal wave with no DC component, it is necessary that the core be reset for each cycle of the ringing frequency. This requirement is satisfied as shown in the above graph, where it is noted that the remanence Br is essentially near zero, as well as coercivity.

3) L must remain stable with respect to frequencies ranging up beyond 1 MHz, in order to function at its predetermined level throughout all components of the impinging ringing wave derived from that transient. This requirement is satisfied in the incorporation of the particular magnetic material utilized in the waveform correction filters of the invention.

Figure 5:
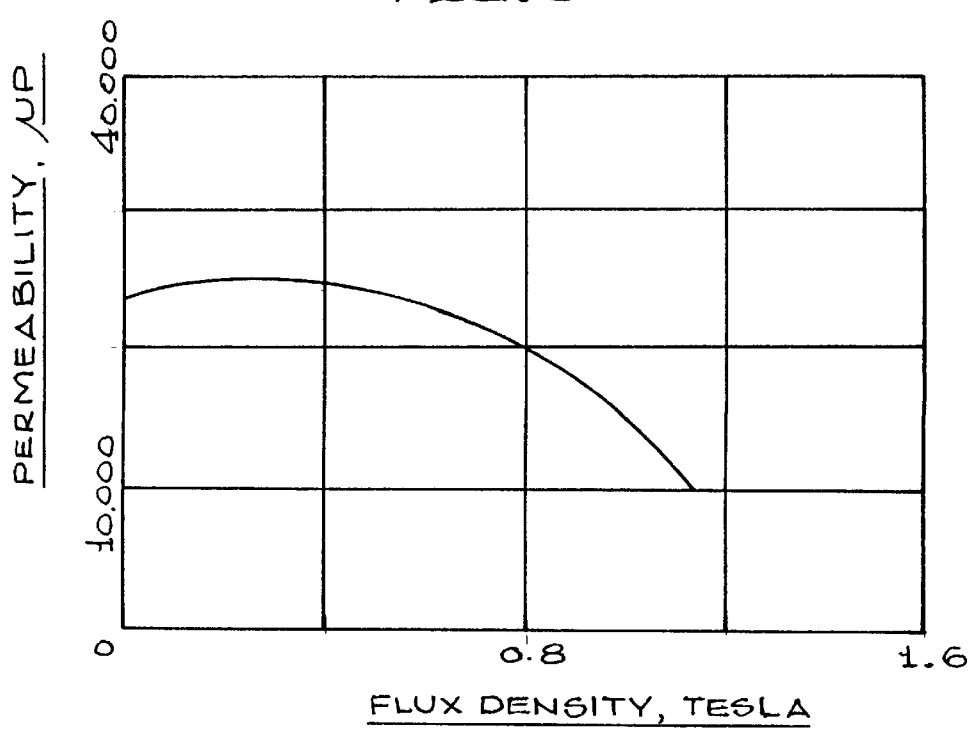
FIG. 5 is a graph showing flux density vs. pulse permeability of the magnetic material of the magnetic core in applicant's system.

4) The pulse permeability versus flux density variation of the magnetic core L must remain in a specified range as shown in the graph FIG. 5.

The range in permeability noted above is important because under a rather random drive from the source, the inductance value must remain at its predetermined level.

Figure 6:
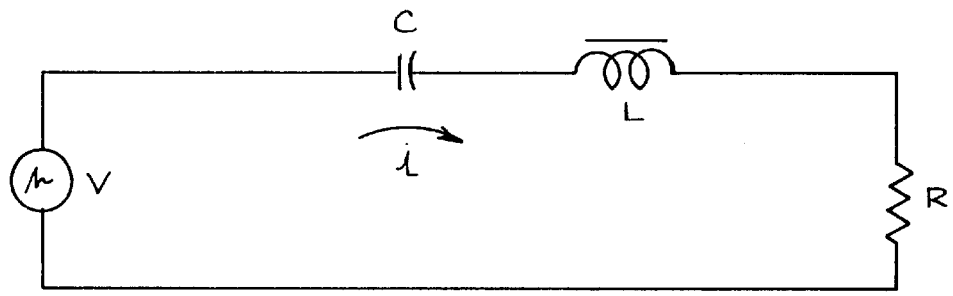
FIG. 6 is a simplified equivalent RLC circuit showing the characteristics of the transient voltage suppression system.

The network essentially takes the form of a series RLC circuit, as shown in FIG. 6.

The effective homogeneous equation for this system is given as:

$$\frac{d^2 i}{dt^2} + \frac{R}{L}\frac{di}{dt} + \frac{i}{LC} = 0$$

$$s^2 + \frac{R}{L}s + \omega_0^2 = 0$$

$$\frac{d}{dt} = s$$

where d/dt=s The roots are $$S_1, S_2 = -\frac{R}{2L} \pm \sqrt{\left(\frac{R}{2L}\right)^2 - \frac{1}{LC}}$$

The critical resistance is determined as:

$$R_{cr} = 2\sqrt{\frac{L}{C}}$$

And the corresponding damping ratio $$\zeta = \frac{R}{R_{cr}} = \frac{R}{2}\sqrt{\frac{C}{L}}$$

The natural frequency is given by $$\omega_n = \frac{1}{\sqrt{LC}}$$

and

The characteristic equation now becomes:

$$S^2 + 2\xi\omega_n S + \xi_n^2$$

Implementing the special properties of the nanocrystalline core material, the two important parameters, $\xi$ and $\omega_n$, in the above characteristic equation can and do govern the performance of the filter system. The performance centers on channeling current and tuning, both based on the cutoff frequency characteristic and proper damping.

The damping ratio $\xi$ is chosen such that the impinging ringing transient is processed and absorbed by the dissipating R in the circuit (as indicated in FIG. 2) the final frequency $\omega_n$ is determined such that the roll-off at −40 dB per decade gives rise to sufficient attenuation at higher frequencies as required in a particular system.

The combination of core material and circuit configuration is the key to the operation of the filter as described above.

Figure 7:
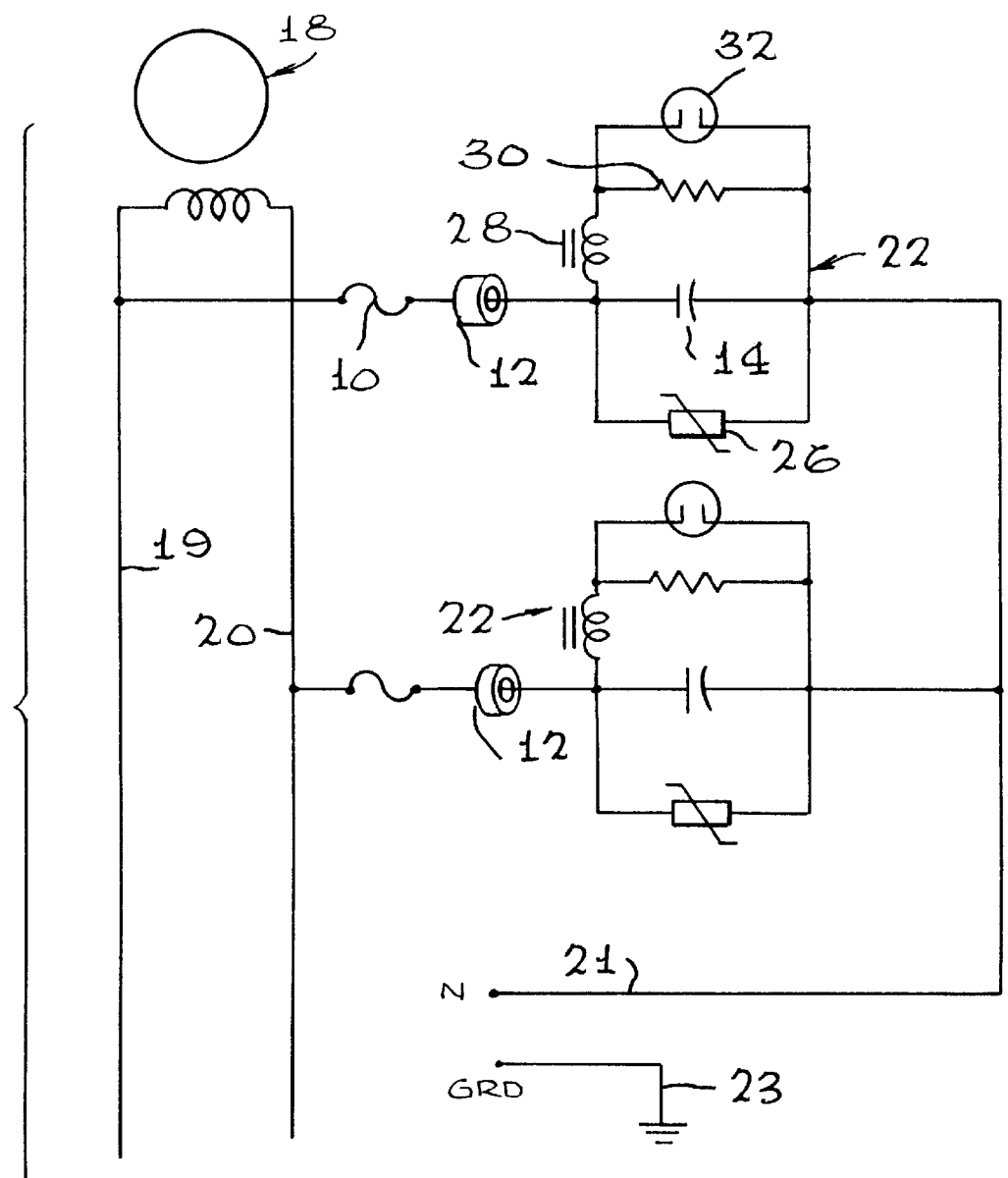
FIG. 7 is a schematic diagram of the waveform correction filter system of the invention as connected to a single-phase motor.

FIG. 7 is a schematic diagram showing two waveform correction filters of the invention connected in a single-phase line. In this example, a single-phase motor 18 is shown connected to an alternating current source through lines 19 and 20. Connected between each of lines 19 and 20, and a neutral line 21, are two identical waveform correction filters 22. A separate ground line 23 is connected between the motor housing and an earth ground.

Each such filter 22 includes a fuse 10, a coaxial amorphous toroidal inductor 12 of soft magnetic material applied in series with the fuse, and a capacitor 14 connected between the coaxial inductor 12 and neutral line 21. Connected in parallel with capacitor 14 are a MOV 26 and a winding with a magnetic core 28 and a resistor 16 connected in series with each other. A lamp 32 is connected in parallel with the resistor 30. A ground line 23 is connected between the case of motor 18 and an earth ground or its equivalent.

Figure 8:
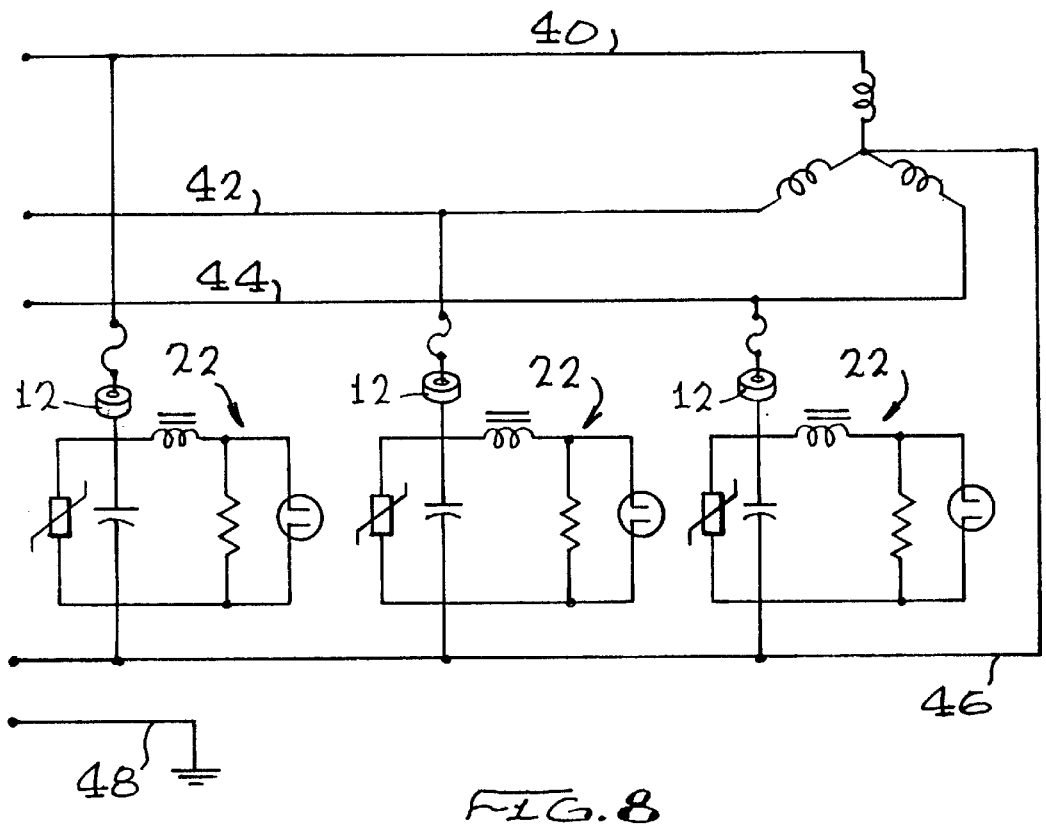
FIG. 8 is a schematic diagram of the waveform correction filter systems as shown in FIG. 7 connected to a three-phase Wye circuit.

FIG. 8 is a schematic diagram showing three of the waveform correction filters 22 connected in a three-phase Wye network to a three-phase motor 36 wherein each filter 22 is connected between one of the phase lines 40, 42 or 44, and a neutral line 46. As in FIG. 1, a separate ground line 48 is connected between the case of motor 36 and earth ground. Each of the filters 22 is identical to that of FIG. 7 except that values of components will vary according to the voltages applied, etc.

Figure 9:
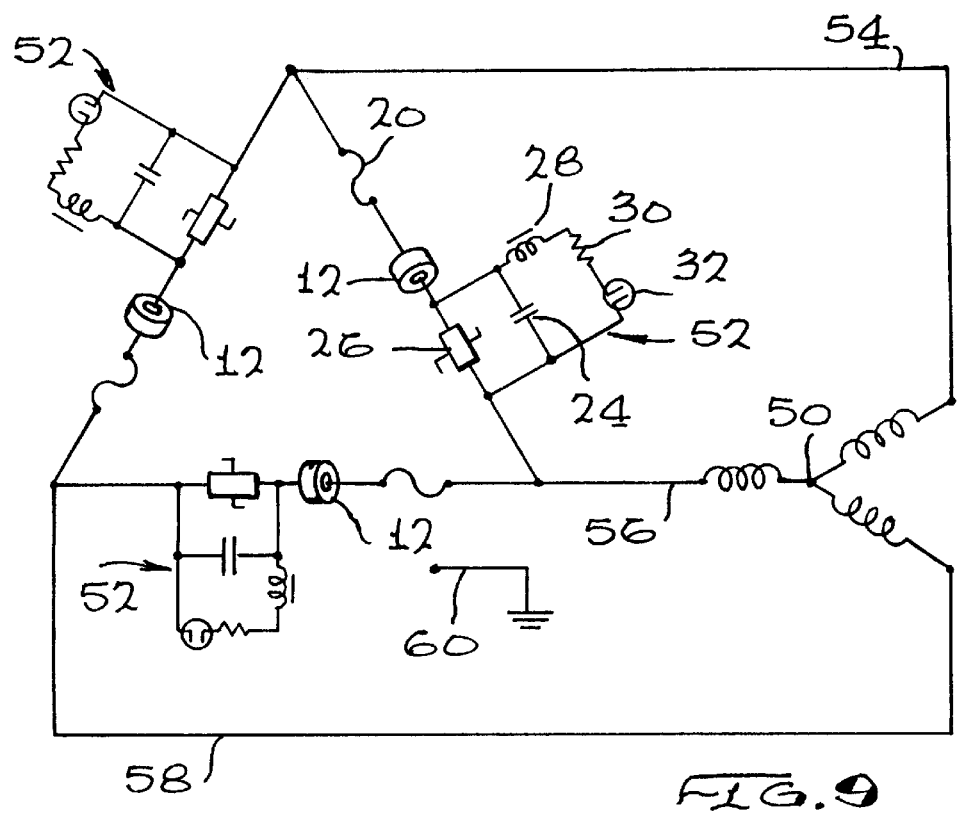
FIG. 9 is a schematic diagram of the waveform correction filter system of the invention connected in a three-phase delta circuit.

FIG. 9 is a schematic diagram showing three waveform correction filters connected in a three-phase delta network to a three-phase motor 50. In this case, the waveform correction filters 52 are connected between phase lines 54, 56 and 58. Each filter 52 is essentially like filters 22 except that the resistor 30, lamp 32, and magnetic core and winding 28 are all connected in series across capacitor 24. This variation is a matter of design choice depending upon the effective resistance desired. A separate ground line 60 is connected between the case of motor 50 and earth ground.

The above-described embodiments of the present invention are merely descriptive of its principles and are not to be considered limiting. The scope of the present invention instead shall be determined from the scope of the following claims including their equivalents.

We claim:

1. A waveform correction filter to be connected to an alternating current power source comprising:
   a fuse;
   inductance means in series with said fuse; and
   a filtering network connected in series with said fuse and said inductance means, said filtering network including in parallel, a varistor, a capacitor, and a magnetic core inductor and resistance means in series with each other and in parallel with said capacitor and said varistor.

2. A waveform correction filter to be connected to an alternating current power source comprising:
   a fuse;
   a coaxial amorphous toroidal inductor of soft magnetic material in series with said fuse; and
   a filtering network connected in series with said fuse and said coaxial amorphous toroidal inductor, said filtering network including a capacitor, a varistor in parallel with said capacitor, and a magnetic core inductor and a resistor in series with each other and in parallel with said capacitor and said varistor.

3. A waveform correction filter as claimed in claim 2 further comprising a lamp connected in parallel with said resistor.

4. A waveform correction filter as claimed in claim 2 further comprising a lamp in series with said magnetic core inductor and said resistor.

5. A waveform correction filter as claimed in claim 2 wherein said magnetic core inductor has high initial permeability, low losses and high saturation flux density.

6. A waveform correction filter as claimed in claim 2 wherein said filtering network comprises a critically damped low pass filter.

7. A waveform correction filter as claimed in claim 2 wherein the response of the magnetic core inductor is substantially linear with respect to current and frequency.

8. A waveform correction filter as claimed in claim 2 wherein the remanence of the magnetic core reactor is near zero.

9. A waveform correction filter network system connected to an alternating current power source including two power lines and a neutral line comprising:

a first filter network connected between one of said lines and neutral, and a second filter network connected between the other of said lines and neutral, each of said first and second filter networks comprising a coaxial amorphous toroidal inductor of soft magnetic material connected to one of said lines and a low pass filter in series with said coaxial amorphous toroidal inductor including, in parallel, a capacitor, a varistor, and an inductance member with a magnetic core inductor, and a resistor connected in series with each other.

10. A waveform correction filter system as claimed in claim 9 further comprising a lamp connected in parallel with each of said resistors.

11. A waveform correction filter network system to be connected to an alternating current power source comprising a first filter network connected between one side of said source and a neutral line, and a second filter network connected to the opposite side of said source and said neutral line, each of said first and second filter networks comprising a fuse and a coaxial amorphous toroidal inductor of soft magnetic material in series, and a filter connected in series with said fuse and said coaxial amorphous toroidal inductor comprising a capacitor, a varistor in parallel with said capacitor, and a magnetic core inductor and a resistor in series with each other and in parallel with said capacitor and said varistor.

12. A waveform correction filter network system as claimed in claim 11 wherein said magnetic core inductors have high initial permeability, low losses and high saturation flux density.

13. A waveform correction filter network system as claimed in claim 11 wherein the remanence of the magnetic core reactors are near zero.

14. A waveform correction filter network system as claimed in claim 11 further comprising a lamp connected in parallel with each of said resistors.

15. A waveform correction filter network system connected between a three-phase, Y-connected alternating current source having three phase lines and a neutral line comprising first, second and third filter networks, each of which is connected between one of said phase lines and said neutral line, each of said filter networks including a coaxial amorphous toroidal inductor of soft magnetic material connected to one of said phase lines, and a filter connected in series with said coaxial amorphous toroidal inductor comprising a capacitor, a varistor in parallel with said capacitor, and a magnetic core inductor and a resistor in series with each other and in parallel with said capacitor and said resistor.

16. A waveform correction filter network system as claimed in claim 15 further comprising a fuse connected between each of said phase lines and said coaxial amorphous inductor.

17. A waveform correction filter network system as claimed in claim 15 wherein said magnetic core inductors have high initial permeability, low losses and high saturation flux density.

18. A waveform correction filter system connected to a three phase delta connected alternating current source having three-phase lines, said system comprising first, second and third filter networks, the first filter network being connected between a first phase line and a second phase line, the second filter being connected between said second phase line and said third phase line, and the third filter network being connected between said third phase line and said first phase line, each of said suppression networks including a coaxial amorphous toroidal inductor of soft magnetic material connected to one of said phase lines, and a filter connected in series with said coaxial amorphous toroidal inductor comprising a capacitor, a varistor in parallel with said capacitor, and a magnetic core inductive member and a resistor in series with each other and in parallel with said capacitor and said resistor.

19. A waveform correction filter system as claimed in claim 18 further comprising a fuse connected between each of said phase lines and said coaxial amorphous inductor.

20. A waveform correction filter system as claimed in claim 18 further comprising a lamp connected in series with each of said resistors and said inductive members.

* * * * *